(12) United States Patent
Henriksen et al.

(10) Patent No.: US 11,068,221 B1
(45) Date of Patent: Jul. 20, 2021

(54) REMOTE MONITORING SYSTEMS AND RELATED METHODS

(71) Applicant: Schweitzer Engineering Laboratories, Inc., Pullman, WA (US)

(72) Inventors: Keith C. Henriksen, Tega Cay, SC (US); Priyanka Nadkar, Charlotte, NC (US)

(73) Assignee: Schweitzer Engineering Laboratories, Inc., Pullman, WA (US)

( * ) Notice: Subject to any disclaimer, the term of this patent is extended or adjusted under 35 U.S.C. 154(b) by 0 days.

(21) Appl. No.: 16/946,135

(22) Filed: Jun. 8, 2020

(51) Int. Cl.
  *G06F 3/14* (2006.01)
  *H04Q 9/00* (2006.01)
  *G06F 3/0481* (2013.01)
  *G06F 3/0488* (2013.01)
  *G06F 3/041* (2006.01)

(52) U.S. Cl.
  CPC .............. *G06F 3/14* (2013.01); *G06F 3/041* (2013.01); *G06F 3/0481* (2013.01); *G06F 3/04883* (2013.01); *H04Q 9/00* (2013.01)

(58) Field of Classification Search
  CPC .......... G06F 1/26; G06F 1/3234; G06F 1/266; G06F 1/3206; G06F 2119/06; G05B 15/02; G05B 2219/32128; G05B 2219/23377; G06Q 50/06; G09G 2354/00; G09G 5/006; Y04S 40/00
  See application file for complete search history.

(56) References Cited

U.S. PATENT DOCUMENTS

| | | | |
|---|---|---|---|
| 7,181,517 B1* | 2/2007 | Iavergne | H04L 41/22 709/224 |
| 9,985,860 B2 | 5/2018 | Zweigle | |
| 10,261,567 B2* | 4/2019 | Mynam | H02H 3/006 |
| 10,656,198 B2 | 5/2020 | Schweitzer | |
| 10,664,553 B2 | 5/2020 | Hewitt | |
| 2012/0005326 A1* | 1/2012 | Bradetich | H04L 12/10 709/223 |
| 2015/0077332 A1* | 3/2015 | Fukatsu | G06F 3/1423 345/156 |
| 2015/0172267 A1* | 6/2015 | Sato | H04L 63/08 726/3 |
| 2017/0322721 A1* | 11/2017 | Thakur | G05B 19/409 |
| 2019/0103762 A1* | 4/2019 | Dolezilek | H02J 3/381 |

* cited by examiner

*Primary Examiner* — Sanjiv D. Patel

(74) *Attorney, Agent, or Firm* — Phillips Winchester LLC; Gregory C. Baker

(57) ABSTRACT

Systems and methods are disclosed herein relating to control of one or more components of an electric power system. A human machine interface (HMI) may be utilized to control and monitor a remote intelligent electronic device (IED) via a local intelligent electronic device (IED) connected to the HMI.

20 Claims, 4 Drawing Sheets

FIG. 3

REMOTE MONITORING SYSTEMS AND RELATED METHODS

TECHNICAL FIELD

This disclosure relates to systems and methods for remotely monitoring one or more portions or components of a system, for example, a portion or a component of an electric power system.

BRIEF DESCRIPTION OF THE DRAWINGS

Non-limiting and non-exhaustive embodiments of the disclosure are described, including various embodiments of the disclosure with reference to the figures, in which.

DETAILED DESCRIPTION

Figure 1:
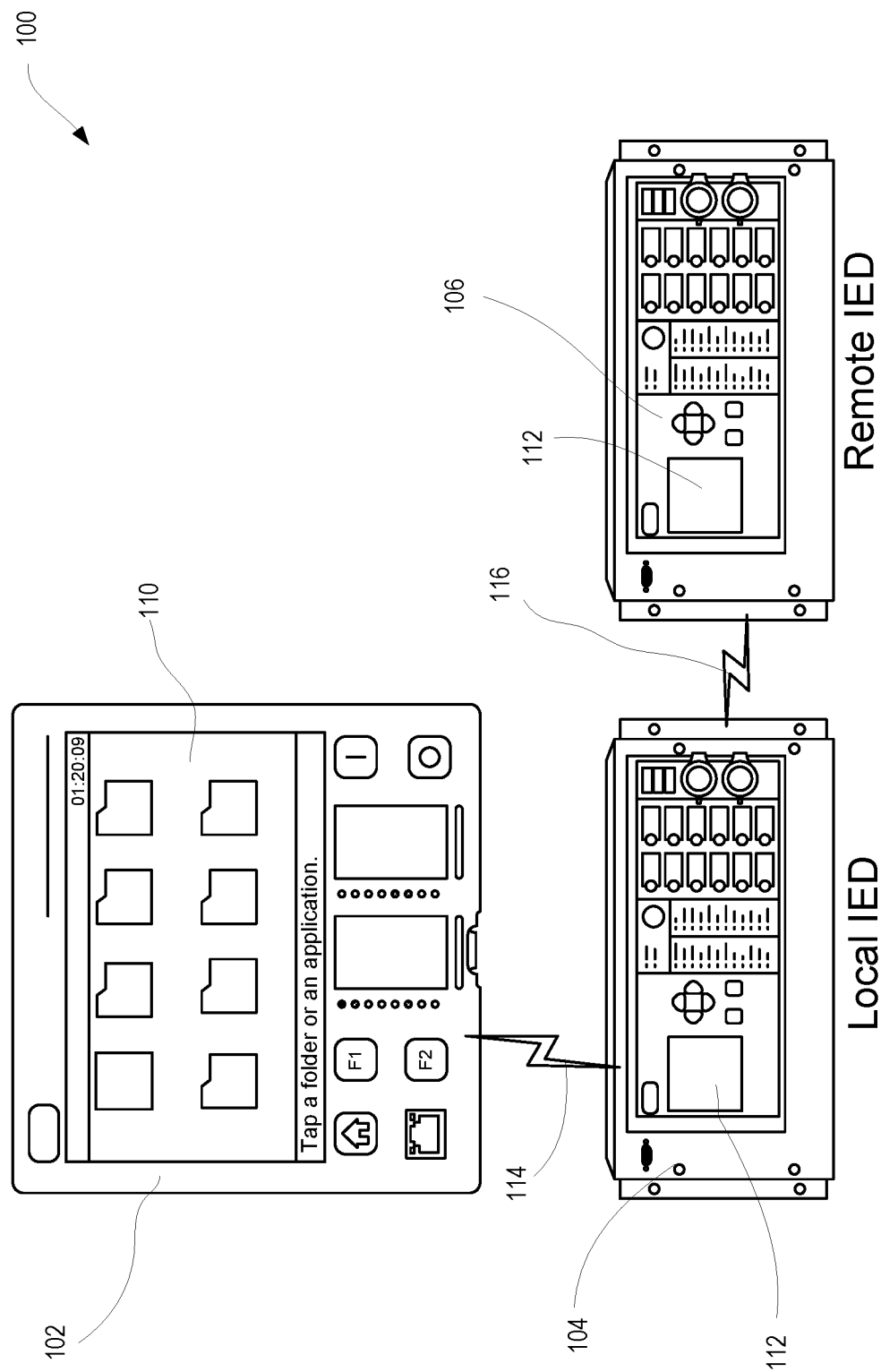
FIG. 1 illustrates a simplified diagram of a system, for example, a system for monitoring and/or controlling an electric power system, in accordance with embodiments of the present disclosure.

The embodiments of the disclosure will be best understood by reference to the drawings. It will be readily understood that the components of the disclosed embodiments, as generally described and illustrated in the figures herein, could be arranged and designed in a wide variety of different configurations. Thus, the following detailed description of the embodiments of the systems and methods of the disclosure is not intended to limit the scope of the disclosure, as claimed, but is merely representative of possible embodiments of the disclosure. In addition, the steps of a method do not necessarily need to be executed in any specific order, or even sequentially, nor do the steps need be executed only once, unless otherwise specified.

In some cases, well-known features, structures, or operations are not shown or described in detail. Furthermore, the described features, structures, or operations may be combined in any suitable manner in one or more embodiments. It will also be readily understood that the components of the embodiments, as generally described and illustrated in the figures herein, could be arranged and designed in a wide variety of different configurations. For example, throughout this specification, any reference to "one embodiment," "an embodiment," or "the embodiment" means that a particular feature, structure, or characteristic described in connection with that embodiment is included in at least one embodiment. Thus, the quoted phrases or variations thereof, as recited throughout this specification, are not necessarily all referring to the same embodiment.

Embodiments may be provided as a computer program product, and/or one or more devices for executing such programs, including a non-transitory machine-readable medium having stored thereon instructions that may be used to program a computer or other electronic device to perform processes described herein. The non-transitory machine-readable medium may include, but is not limited to, hard drives, floppy diskettes, optical disks, CD-ROMs, DVD-ROMs, ROMs, RAMs, EPROMs, EEPROMs, magnetic or optical cards, solid-state memory devices, or other types of media/machine-readable medium suitable for storing electronic instructions. In some embodiments, the computer or other electronic device may include a processing device such as a microprocessor, microcontroller, logic circuitry, or the like. The processing device may further include one or more special-purpose processing devices such as an application-specific interface circuit (ASIC), programmable array logic (PAL), programmable logic array (PLA), programmable logic device (PLD), field programmable gate array (FPGA), or any other customizable or programmable device.

The phrases "connected," "coupled," and "in communication with" refer to any form of interaction between two or more components, including mechanical, electrical, magnetic, and electromagnetic interaction, depending on the context. Two components may be connected to each other, even though they are not in direct contact with each other, and even though there may be intermediary devices between the two components.

Electric power generation and delivery systems are designed to generate, transmit, and distribute electrical energy to loads. Electric power generation and delivery systems may include a variety of equipment, such as electrical generators, electrical motors, power transformers, power transmission and distribution lines, circuit breakers, switches, buses, transmission and/or feeder lines, voltage regulators, capacitor banks, and the like. Such equipment may be monitored, controlled, automated, and/or protected using intelligent electronic devices (IEDs) that receive electric power system information from the equipment, make decisions based on the information, and/or provide monitoring, control, protection, and/or automation outputs to the equipment.

In some embodiments, an IED may include, for example, remote terminal units, differential relays, distance relays, directional relays, feeder relays, overcurrent relays, voltage regulator controls, voltage relays, breaker failure relays, generator relays, motor relays, automation controllers, real-time automation controllers, bay controllers, meters, recloser controls, communication processors, computing platforms, programmable logic controllers (PLCs), programmable automation controllers, governors, exciters, statcom controllers, static var compensator (SVC), on-load tap-changer (OLTC) controllers, and the like. Electric power system equipment may be monitored and protected from various malfunctions and/or conditions using one or more IEDs. For example, an IED may be configured to detect and protect the electric power system equipment from abnormal conditions, such as faults. IEDs may be configured to take protective actions such as commanding a circuit breaker to open, in the event of a detected fault.

In some embodiments, IEDs may comprise an input and/or output device or devices, such as, for example, a standalone display (e.g., a touchscreen) that may interface with (e.g., control and/or monitor via a wired and/or wireless connection) one or more devices (e.g., an external device, such as another connected IED).

In some embodiments, the IEDs may be communicatively connected via a network that includes, for example, multiplexers, routers, hubs, gateways, firewalls, and/or switches to facilitate communications on the networks, each of which may also function as an IED. Networking and communication devices may also be integrated into an IED and/or be in communication with an IED. As used herein, an IED may include a single discrete IED or a system of multiple IEDs operating together.

Embodiments of the disclosure may relate to a first IED that may be configured (e.g., placed in a selected mode) to remotely interface with (e.g., control and/or monitor) one or more other IEDs (e.g., via a wireless and/or wired connection). For example, a first IED may comprise only an input and/or output device (e.g., a human machine interface (HMI), such as, for example, a touchscreen display) or may comprise a standalone computing device with a processor, controller, and/or memory along with an input and/or output device. Such a first IED may function as a remote control (e.g., a remote-control touchscreen display) for any additional IEDs connected to the first IED via a connection or network (e.g., via a local area network (LAN)).

The first IED (e.g., an HMI) may be connected to and remotely control and/or monitor a second IED. For example, the HMI may directly connect (e.g., via a point-to-point connection) to the second IED. Further, the first IED may further function to control and/or monitor additional IEDs via the second IED, which may function effectively as a switch between the first IED and the additional IEDs, as discussed below in detail. In some embodiments, such control and/or monitoring may take place in an active session of the HMI and may be manually and/or automatically concluded. In some embodiments, when an HMI is controlling an IED, it may, mainly or solely, be monitoring the IED as part of such control (e.g., control by monitoring output while not providing substantial input).

In some embodiments, such a remote-control configuration may enable remote control of IEDs where direct control may be impractical, inconvenient, difficult, problematic, not user friendly, unfeasible, and/or unworkable. For example, such a remote-control configuration may be implemented where the additional IED or IEDs lack an HMI or include an HMI with a less-than-desirable interface (e.g., a touchscreen that is relatively small and/or difficult to interface with). By way of further example, such a remote-control configuration may be implemented where the additional IED or IEDs are placed in a remote that is difficult to access and/or that are installed in an impractical and/or inhospitable locations making direct access by a user difficult, if not impossible. In some embodiments, such a remote-control configuration may be implemented where the additional IED or IEDs are placed in a hazardous or otherwise dangerous environment (e.g., an environment with arc flash zones, chemical exposure, etc.). The remote configuration may enable control of such IEDs without requiring a user to enter such an area that may be detrimental to the user's health or wellbeing.

In some embodiments, as noted above, the HMI may monitor (e.g., mirror) one or more IEDs. For example, the IED may include separate monitoring and controlling modes. In the monitoring mode, the HMI may mirror the local IED and/or remote IEDs. A single IED or multiple IEDs can be mirrored at the same time on the HMI. In such a monitoring mode, any screen touches on a connected IED may be mirrored back to the HMI. Such a configuration may be used to monitor operation being carried out by an operator. In some embodiments, if a user selects monitoring mode, the HMI may change to controlling mode, if the IED is configured to permit HMI override when the IED is actively in use by a local or remote operator.

In some embodiments, the IED may display that the mode of the IED has changed to controlling mode and/or may not display the mode when in monitoring mode.

In some embodiments, the IEDs may include a setting to prevent control from being assumed by a remote HMI when the IED is in use by an operator or when another HMI is already controlling the IED.

In some embodiments, the second IED may establish trust and security relationships with other devices (e.g., the additional IEDs) for the HMI. For example, the second IED may be responsible for establishing connections with local and/or remote IEDs on the same network including authenticating connections between devices (e.g., via passwords, certificates, two-factor authentications, tokens, biometrics, transaction authentications, computer recognitions, handshakes, CAPTCHAs, and single sign-ons, etc.) in order to establish machine-to-machine trust. That is, the second IED may handle the routing and/or security relating to the HMI rather than the HMI itself or other components of a network (e.g., routers, switches, etc.) handling such operations.

In such embodiments, the HMI may use any communications physical layer and/or protocol to act as the display for any IED in the network since the directly connected device (e.g., the second IED) is responsible for machine-to-machine trust and communications.

In some embodiments, the point-to-point connection between HMI and second IED may enable the HMI to be located outside a secure perimeter of the network, where the second IED handles relaying of communications only between trusted devices in the network. Such an embodiment may eliminate the need to provide separate authentication and/or connection to the network for the HMI (e.g., through an IP address) as the connection to second IED may enable the HMI to interface with any device on the same network via the second IED. In some embodiments, the HMI may be restricted to only communicate with the second IED to prevent any external connection to or communication with the HMI. Such a configuration may enable the HMI to be safely used outside of a secure perimeter (e.g., physical and/or virtual perimeter) of the network.

Using such a communication configuration, the second IED may enable the HMI to connect to any device on a shared communication link with the second IED.

FIG. 1 illustrates a simplified diagram of a system 100 (e.g., for monitoring and/or controlling an electric power system). As shown in FIG. 1, the system 100 includes two or more IEDs (e.g., an HMI 102, one or more local IEDs 104, and one or more remote IEDs 106). As discussed above, the HMI 102 may include only an input and/or output device (e.g., a touchscreen that outputs basic data relating to user input and displays information from another computing device) or may comprise a standalone computing device including one or more computer elements, such as, a processor, controller, and/or memory along with the associated input and/or output device, as discussed below in greater detail with relation to FIG. 4.

Although not necessarily shown to scale, FIG. 1 depicts that the HMI 102 may include a display 110 that is relatively larger than display elements 112, if any, of the other IEDs (e.g., the local IED 104 and the remote IEDs 106). For example, the HMI 102 may include a relatively larger color touchscreen that includes a graphical user interface (GUI) that is relatively easier to interact with as opposed to the interface of the other IEDs. In some embodiments, the display 110 may include additional control icons and/or options that would be impractical to display on the relatively smaller displays, if any, of the local IED 104 and the remote IEDs 106.

As depicted, the HMI 102 is connected to the local IED 104 through a first connection 114 (e.g., a direct connection via a physical interface, such as an Ethernet connection or a power over Ethernet (PoE) connection, a direct wireless connection, a permanent connection, a temporal connection, combinations thereof, etc.). The relatively larger display 110 (e.g., a color display) may be utilized to monitor and/or control the local IED 104.

The HMI 102 may be connected to the remote IED 106 via the local IED 104 and through a second connection 116 (e.g., a direct connection via a physical interface, such as an Ethernet connection or a power over Ethernet (PoE) connection, a direct wireless connection, a permanent connection, a temporal connection, combinations thereof, etc.) between the local IED 104 and the remote IED 106. For example, the HMI 102 may be connected to the remote IED 106 via both the first connection 114 and second connection 116. In some embodiments, the first connection 114 and the second connection 116 may be a similar type of connection (e.g., wired, wireless) or may be differing type of connections (e.g., one wired, one wireless). For example, the first connection 114 may comprise a local wired connection and the second connection may comprise a connection over a network (e.g., a relatively larger network to which both the local IED 104 and the remote IED 106 are connected, a local and/or private secured network).

The local IED 104 may effectively function as a host that may switch between a first operational or communication mode where the HMI 102 controls the local IED 104 and a second operational or communication mode where the HMI 102 controls the remote IED 106 via the local IED 104. Stated in another way, the HMI 102 may control one or more remote IEDs 106 by using the local IED 104 as a host and/or a switch to transfer serial communications between the display and a network-connected remote IED 106, where the activation of such a switch may be effected via the HMI 102, the local IED 104, or both.

In additional embodiments, the HMI 102 may be configured to operate as a switch and may transfer data with the remote IED 106 without the use of the local IED 104.

While the above embodiment contemplates that the HMI 102 controls the local IED 104, in additional embodiments, the HMI 102 may not be configured to control the local IED 104 and may utilize the local IED 104 only as a host to control the remote IED 106.

In some embodiments, the local IED 104 and/or the HMI 102 may be responsible for establishing connections with the respective local or remote IEDs 104, 106, including authenticating the connections 114, 116 (e.g., via passwords, certificates, two-factor authentications, tokens, biometrics, transaction authentications, computer recognitions, handshakes, CAPTCHAs, and single sign-ons, etc.) in order to establish machine-to-machine trust. For example, as discussed above, the local IED 104 may be solely responsible for establishing connections with the remote IED 106 along with the trust and security relationships. The HMI 102 may act as the display for any of the local or remote IEDs 104, 106 in the network since the directly connected device (e.g., the local IED 104) is responsible for machine-to-machine trust and communications. The point-to-point connection between HMI 102 and local IED 104 may enable the HMI 102 to be located outside a secure perimeter of the network, where the local IED 104 handles relaying of communications only between trusted devices in the network.

The local IED 104 may act as a switch to connect the remote IED 106 to the HMI 102 (e.g., a local color touch display) using any method of data communications between the switching local IED 104 and the remote IED 106. The HMI 102 may be utilized to emulate and control a plurality of IEDs 104, 106 and the use of the HMI 102 may be enabled and/or disabled by settings in the IEDs 104, 106 or in the HMI 102, along with an associated password input into the HMI 102 in order to gain control of the IEDs 104, 106.

As shown in FIG. 1, the HMI 102 with built-in display 110 (e.g., which may comprise a device similar to the other IEDs 104, 106) may connect to the local IED 104 via wire connection (e.g., a peer-to-peer PoE connection). The local IED 104 may be considered a host for the display 110 of the HMI 102. When the display 110 is communicating with and facilitating display of data from the local IED 104, the HMI 102 may operate in a local display mode and may indicate such a mode on the display 110 (e.g., to inform a user of the current mode). In some embodiments, the display 112 on the local IED 104 may indicate that the local IED 104 is being remotely controlled and/or monitored by the HMI 102 (e.g., and may indicate an identification of the particular HMI 102).

The control operations on the local IED 104 may be permitted when the HMI 102 is in the local display mode, where the user is authorized to control and/or monitor the local IED 104. Control of the local IED 104 may be terminated by the user (e.g., at the HMI 102), may remain open, and/or may time out and automatically disconnect after a selected period of time (e.g., a period of time of inactivity).

The HMI 102 may operate in a self or normal mode where the HMI has an application running on it or the HMI is an IED itself and, for example, when the HMI 102 is not connected to the local or remote IEDs 104, 106.

When the local IED 104 is acting to exchange data (e.g., control, instructions, messages, etc.) between the HMI 102 and the remote IED 106, the local IED 104 may operate in a display switch mode. When the local IED 104 is in the display switch mode, the HMI 102 may connect to the remote IED 106 if the user is authorized to access the remote IED 106 (e.g., via a remote IED connection screen accessed via the HMI 102). When the HMI 102 is connected to the remote IED 106, the display 110 of the HMI 102 may indicate that the HMI 102 is in a remote display mode (e.g., as opposed to the local display mode discussed above).

In some embodiments, when the HMI 102 is connected to the remote IED 106 via the local IED 104 (e.g., in the remote display mode), the HMI 102 may not display any information relating to the local IED 104 and/or the HMI 102 may not control any aspect of the local IED 104, with the exception of being able to terminate the display switch mode of the local IED 104. In some embodiments, the local IED 104 may or may not display that it is operating in display switch mode.

The HMI 102 may enable the user to switch between the local display mode and the remote display mode. For example, the HMI 102 and/or the display 110 of the HMI 102 may include physical and/or virtual interfaces (e.g., buttons, switches, toggles, etc.) for switching between the modes.

In some embodiments, the indication of the local display mode and/or the remote display mode may be clearly and consistently indicated on the HMI 102 (e.g., on the display 110) such that the user is constantly reminded of which device the user is controlling. In some embodiments, when the local IED 104 is in display switch mode the display 110 shall not display any information from the local IED 104 and/or may display an indication of the current mode.

As above, control of the remote IED 106 may be terminated by the user (e.g., at the HMI 102), may remain open, and/or may time out and automatically disconnect after a user-selected period of time (e.g., a period of time of inactivity). Upon termination, the HMI 102 may return to the local display mode configuration or the normal mode configuration.

Figure 2:
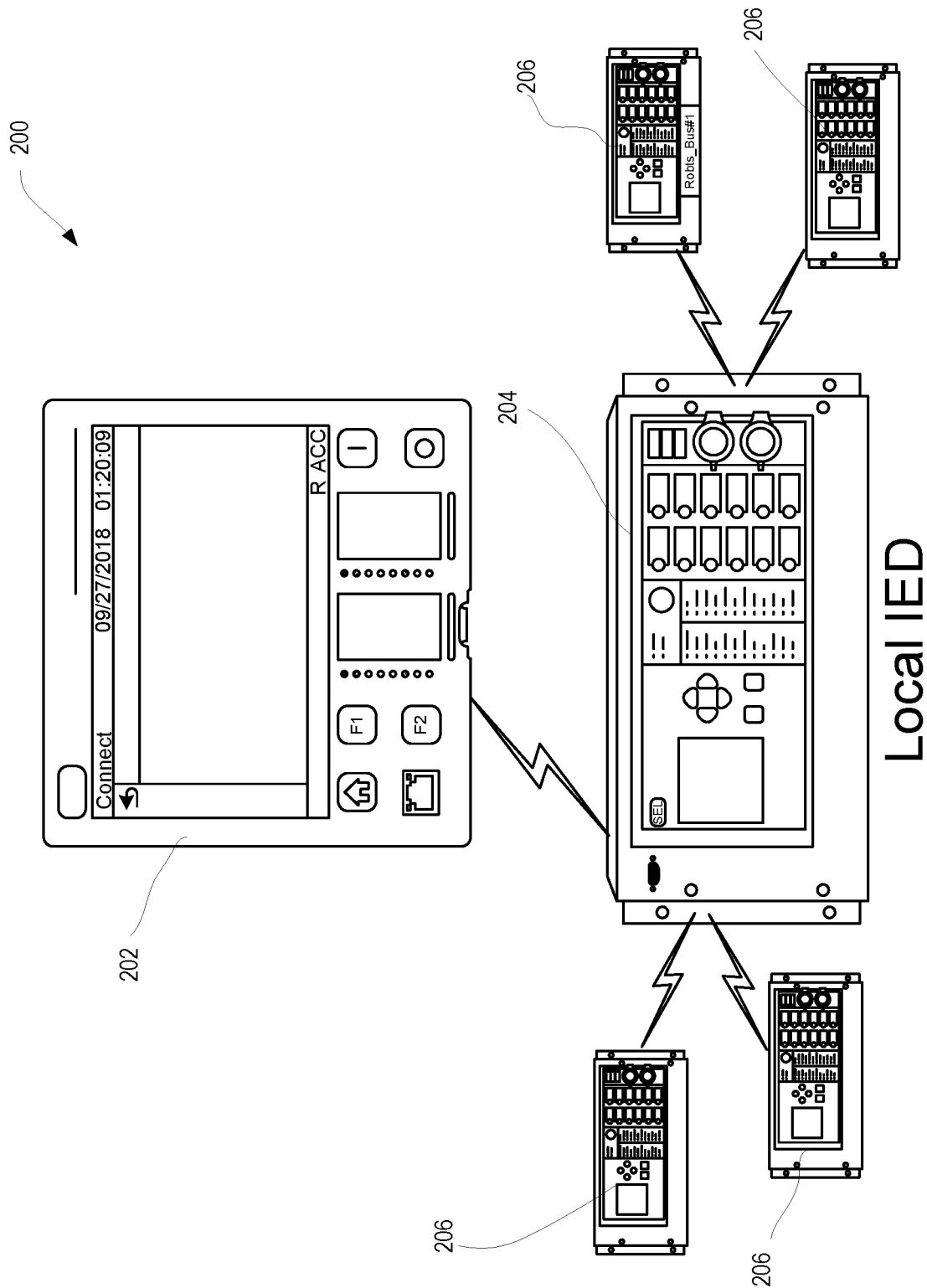
FIG. 2 illustrates a simplified diagram of a system, for example, a system for monitoring and/or controlling an electric power system, in accordance with embodiments of the present disclosure.

FIG. 2 illustrates a simplified diagram of a system 200 (e.g., a system for monitoring and/or controlling an electric power system). As shown in FIG. 2, the system 200 includes an HMI 202 in direct communication with one local IED 204. The local IED 204 is connected to multiple remote IEDs 206 (e.g., via a network). As above, the local IED 204 may act as a switch between the multiple remote IEDs 206 and the HMI 202. Via the local IED 204, the HMI 202 may control one of multiple remote IEDs 206 at a time or may control some or all of the multiple remote IEDs 206 simultaneously.

When the local IED 204 is in the display switch mode, the HMI 202 may indicate that the HMI 202 is in a remote display mode and may provide an indicator of which of the remote IED(s) 206 the HMI 202 is connected to and monitoring and/or controlling. As above, one or more of the IEDs 204, 206 may also display the current operating mode (e.g., display switch mode, remote control mode, etc.)

As also discussed above, in some embodiments, the HMI 202 may also control the local IED 204 in a local mode.

Figure 3:
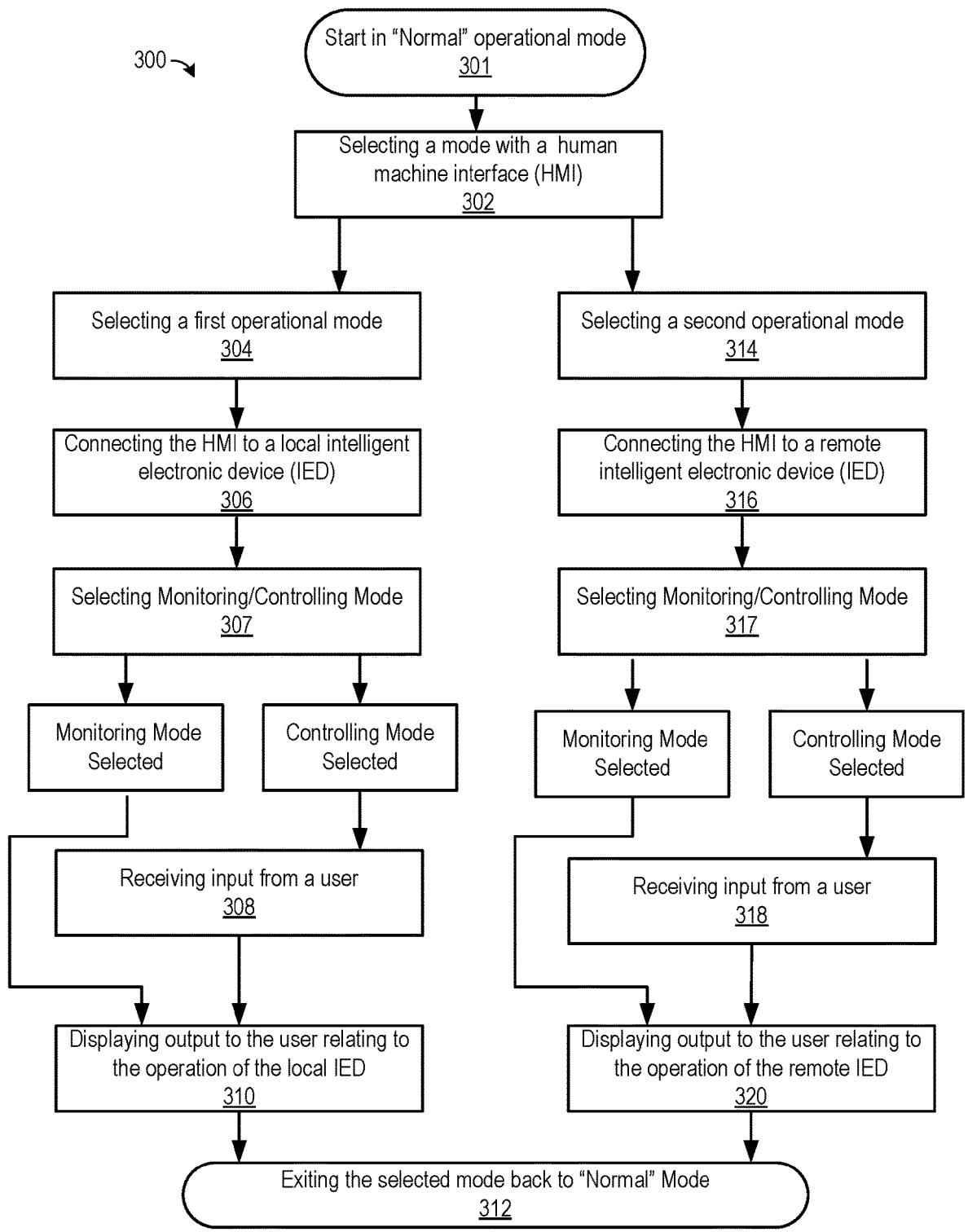
FIG. 3 illustrates a flow chart of a method of monitoring and/or controlling a device in communication with an electric power system in accordance with embodiments of the present disclosure.

FIG. 3 illustrates a flow chart of a method 300 of controlling a device in communication with an electric power system.

In 301, the HMI may be in a self or normal mode where the display or the HMI has an application running on it or the HMI itself is an IED, for example, where the HMI is not connected to any other IEDs.

In 302, a mode of operation (e.g., a local mode or a remote mode) is selected by a user with a device (e.g., the HMI 102, 202 in FIGS. 1 and 2). In some embodiments, the HMI may be switched from the normal mode to this control/monitoring mode.

In 304, the user selects the first, local operational mode.

In 306, the HMI may connect to a local intelligent electronic device (IED) (e.g., local IED 104, 204 in FIGS. 1 and 2). As above, authentication may be required to affect the connection.

In 307, a user may select a monitoring mode or a control mode. As depicted, these modes may be separate modes of operation of the HMI. In additional embodiments, the HMI may operate simultaneously in such modes.

In 308, input is received from the user (e.g., via the HMI) in the controlling mode.

In 310, output relating to the operation of the local IED may be displayed to the user in the controlling mode and/or the monitoring mode.

In 312, the local mode may by ended and the HMI may disconnect or may remain connected until further input is received.

In 314, the user selects the second, remote operational mode.

In 316, the HMI may connect to a remote intelligent electronic device (IED) (e.g., remote IED 106, 206 in FIGS. 1 and 2) via the local IED, which acts as a switch between the remote IED(s), the HMI, and, optionally, one or more additional remote IEDs. As above, authentication may be required to affect the connection. For example, the local IED may be solely responsible for establishing connections with the remote IED(s) along with the trust and security relationships In 318, input is received from the user (e.g., via the HMI) in the controlling mode.

In 320, output relating to the operation of the remote IED may be displayed to the user in the controlling mode and/or the monitoring mode.

In 312, the remote mode may by ended and the HMI may disconnect and may revert back to the local mode or back to the normal mode.

Figure 4:
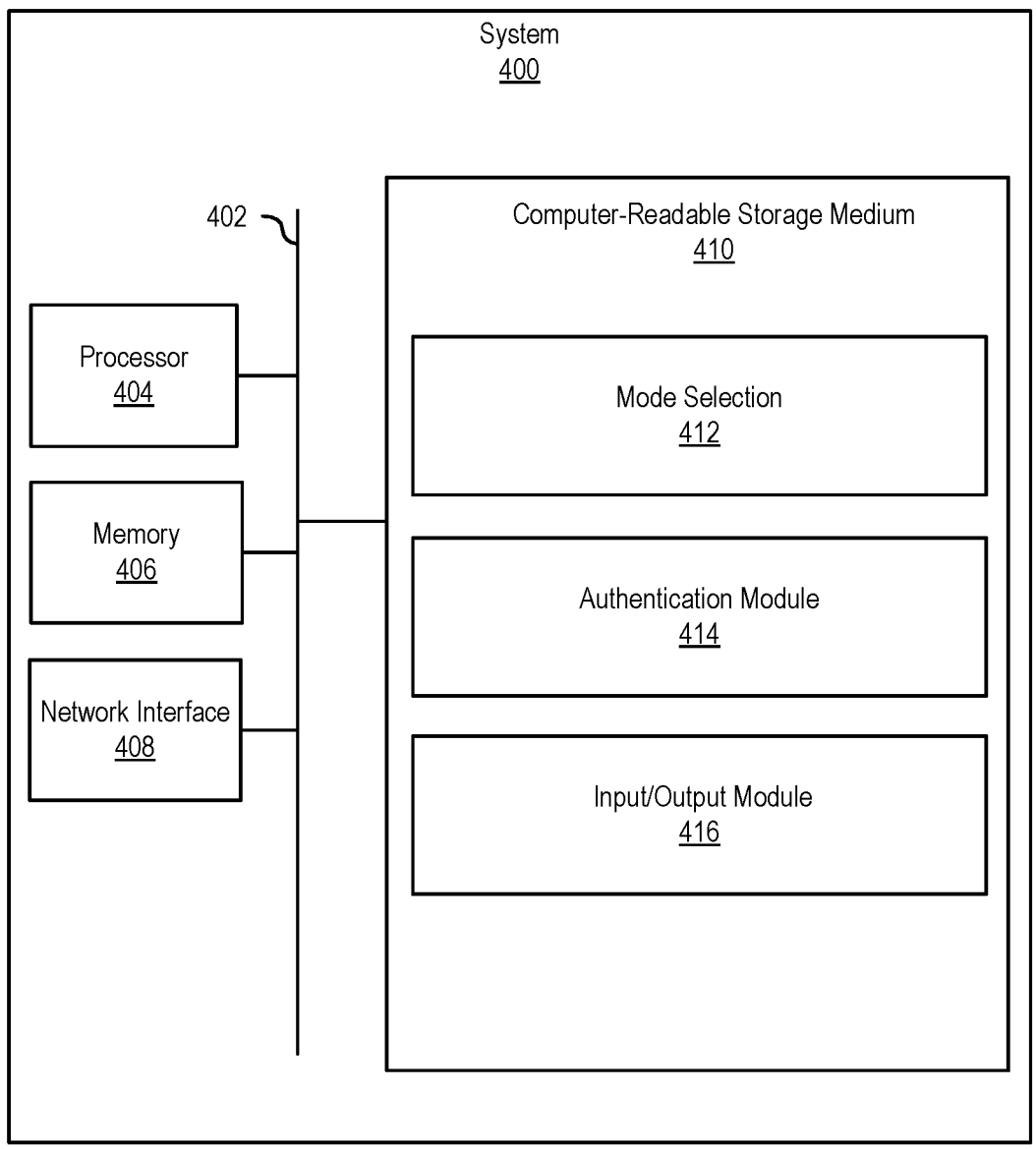
FIG. 4 illustrates a simplified, functional block diagram of a computer system, for example, a computer system for monitoring and/or controlling an electric power system, in accordance with embodiments of the present disclosure

FIG. 4 illustrates a block diagram of an example computing device 400, which may be part of the HMI (e.g., the HMI 102, 202 in FIGS. 1 and 2) or to which the HMI 102, 202 may be connected to and control (e.g., where the HMI 102, 202 is connect to and control another IED, such as the local IED 104, 204 in FIGS. 1 and 2).

As shown in FIG. 4 and also referring back to FIGS. 1 and 2, the computing device 400 includes a bus 402 connecting a microcontroller or processor 404 (e.g., microprocessor, Field Programmable Gate Array (FPGA), etc.), a memory 406, a communication or network interface 408, and a computer-readable storage medium 410. The computer-readable storage medium 410 may include various modules 412-416. In the illustrated example, the modules 412-16 are implemented as instructions to be executed by the microcontroller or processor 404. However, in other examples, the modules 412-416 may be implemented as processor-executable instructions, firmware, hardware, or combinations thereof.

A mode selection module 412 may operate to selectively cause the computing device 400 to operate in any of two or more distinct operational modes. For example, in a first local mode, the computing device 400 may connect the HMI 102, 202 to the local IED 104, 204. In a second remote mode, the computing device 400 may connect the HMI 102, 202 to one or more remote IEDs 106, 206. In additional modes, the computing device 400 may connect the HMI 102, 202 to addition IEDs, either remote or local.

An authentication module 414 may operate to restrict the connections between the HMI 102, 202 and the target IEDs 104, 106, 204, 206 by requiring input (e.g., from a user via the HMI 102, 202) to validate and/or secure the connection as discussed above.

An input and output module 416 may operate to relay user inputs received via the HMI 102, 202 to the connected IEDs 104, 106, 204, 206 and/or send output from the connected IEDs 104, 106, 204, 206 back to the HIM 102 202, via one or more communication interfaces.

Specific embodiments and applications of the disclosure are described above and illustrated in the figures. It is, however, understood that many adaptations and modifications can be made to the precise configurations and components detailed above. In some cases, well-known features, structures, or operations are not shown or described in detail. Furthermore, the described features, structures, or operations may be combined in any suitable manner in one or more embodiments. It is also appreciated that the components of the embodiments as generally described and illustrated in the figures herein could be arranged and designed in a wide variety of different configurations. Thus, all feasible permutations and combinations of embodiments are contemplated.

In the description above, various features are sometimes grouped together in a single embodiment, figure, or description thereof for the purpose of streamlining the disclosure. This method of disclosure, however, is not to be interpreted as reflecting an intention that any claim requires more features than those expressly recited in that claim. Rather, as the following claims reflect, inventive aspects lie in a combination of fewer than all features of any single foregoing disclosed embodiment. Thus, the claims are hereby expressly incorporated into this Detailed Description, with each claim standing on its own as a separate embodiment. This disclosure includes all permutations and combinations of the independent claims with their dependent claims.

It will be apparent to those having skill in the art that changes may be made to the details of the above-described embodiments without departing from the underlying principles of the disclosure.

What is claimed is:

1. A display system for interfacing with at least a portion of an electric power system, comprising:
 a human machine interface (HMI) to selectively operate in at least two different operational modes, including:
  a first operational mode in which the HMI is in communication with a local intelligent electronic device (IED) for receiving input from a user and to display output to the user relating to operation of the local IED; and
  a second operational mode in which the HMI is in communication with a remote intelligent electronic device (IED) via the local IED for receiving input from the user and to display output to the user relating to operation of the remote IED;
  the HMI to enable the user to toggle between the first operational mode and the second operational mode.

2. The display system of claim 1, wherein the HMI comprises a touchscreen.

3. The display system of claim 2, wherein the touchscreen is capable of displaying relatively more graphical elements than at least one of an HMI of the local IED or an HMI of the remote IED.

4. The display system of claim 1, wherein the HMI comprises an IED including a processor and memory, the HMI for operating in a third operational mode where the HMI is disconnected from any other IEDs.

5. The display system of claim 1, wherein the HMI is adapted to communicate to the remote IED only in a communication pathway via the local IED, and wherein the HMI is adapted to be connected with and authenticated to the remote IED with the local IED.

6. The display system of claim 1, wherein the HMI and the local IED are coupled via a network interface.

7. The display system of claim 1, wherein the HMI is adapted to only communicate with the local IED and the remote IED after authentication of the HMI.

8. The display system of claim 1, wherein the HMI is adapted to:
 enable the user to enter into the first operational mode in order to control the local IED;
 enable the user to enter into the second operational mode in order to control the remote IED; and
 enable the user to withdraw from at least one of the first operational mode or the second operational mode.

9. The display system of claim 1, wherein the HMI is adapted to indicate whether the HMI is in the first operational mode in control of the local IED or the second operational mode of the remote IED.

10. The display system of claim 9, wherein at least one of the local IED or the remote IED is adapted to indicate whether the HMI is controlling at least one of the local IED or the remote IED.

11. A method of controlling a device in communication with an electric power system, the method comprising:
 in a first operational mode of a human machine interface (HMI):
  connecting the HMI to a local intelligent electronic device (IED); and
  at least one of receiving input from a user or displaying output to the user relating to operation of the local IED;
 in a second operational mode:
  connecting the HMI to a remote intelligent electronic device (IED) via the local IED; and
  at least one of receiving input from the user or displaying output to the user relating to operation of the remote IED; and
 enabling the user to toggle between the first operational mode and the second operational mode with the HMI.

12. The method of claim 11, further comprising:
 enabling the user to enter into the first operational mode in order to control the local IED; and
 enabling the user to enter into the second operational mode in order to control the remote IED.

13. The method of claim 12, further comprising enabling the user to withdraw from at least one of the first operational mode or the second operational mode.

14. The method of claim 12, further comprising receiving authentication from the user in order to enter the first operational mode or the second operational mode.

15. The method of claim 11, further comprising prohibiting the user from controlling the local IED with the HMI when the user is controlling the remote IED in the second operational mode.

16. The method of claim 11, further comprising, after controlling the remote IED in the second operation mode or the local IED in the first operational mode, returning to one of controlling the local IED in the first operational mode or a third operational mode where the HMI is disconnected from any IEDs after a selected period of time of inactivity by the user has passed.

17. The method of claim 11, further comprising authenticating the connection between the HMI and the remote IED with the local IED.

18. The method of claim 11, further comprising:
 disconnecting the HMI from the remote IED and returning to one of the connection between the HMI and the local IED or a third operational mode where the HMI is disconnected from any IEDs; or
 disconnecting the HMI from the local IED and returning to the third operational mode where the HMI is disconnected from any IEDs.

19. A method of controlling a device in communication with an electric power system, the method comprising:
 enabling a user to, via a human machine interface (HMI), connect the HMI to a local intelligent electronic device (IED); and
 in a remote IED control mode, enabling the user to, via the HMI:
  connect the HMI to a remote intelligent electronic device (IED) via the local IED;
  provide input at the HMI to the remote IED; receive output at the HMI relating to the remote IED, the output being sent from the remote IED to the HMI via the local IED; and
 prohibiting the user from controlling the local IED with the HMI when the user is controlling the remote IED in the remote IED control mode.

20. The method of claim 19, further comprising enabling the user to toggle between the remote IED control mode and a local IED control mode with the HMI.

* * * * *